F. E. NORTON.
PROCESS OF SEPARATING MIXED GASES.
APPLICATION FILED AUG. 31, 1915. RENEWED JULY 29, 1919.
1,354,056. Patented Sept. 28, 1920.
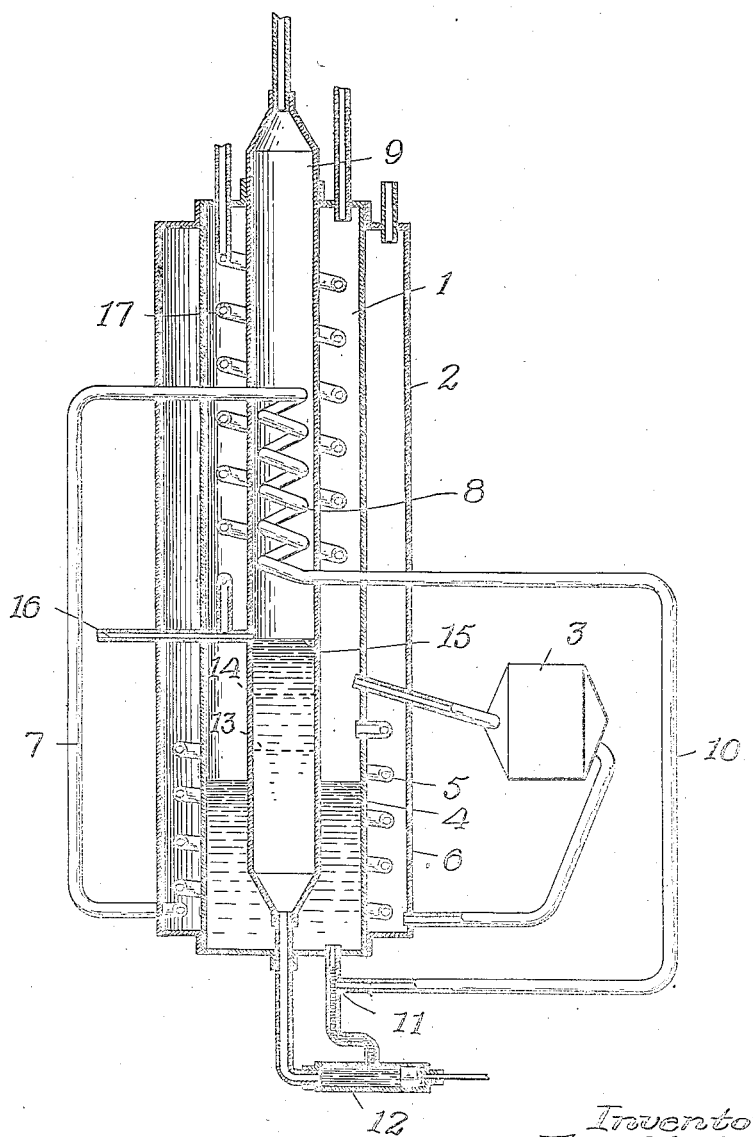

UNITED STATES PATENT OFFICE.

FRED E. NORTON, OF WORCESTER, MASSACHUSETTS, ASSIGNOR TO JEFFERIES-NORTON CORPORATION, A CORPORATION OF DELAWARE.

PROCESS OF SEPARATING MIXED GASES.

1,354,056.  Specification of Letters Patent.  Patented Sept. 28, 1920.

Application filed August 31, 1915, Serial No. 48,325. Renewed July 29, 1919. Serial No. 314,162.

*To all whom it may concern:*

Be it known that I, FRED E. NORTON, a citizen of the United States, residing at Worcester, in the county of Worcester and Commonwealth of Massachusetts, have invented a new and useful Improvement in Processes of Separating Mixed Gases, of which the following, together with the accompanying drawing, is a specification.

The present invention relates in general to processes employed for the separation of mixed gases, such as air or water gas, into their constituent elements, and has particular reference to processes of this class which contemplate a partial separation of the components of the gas by liquefaction, and a complete separation by the progressive re-evaporation of the condensate, accompanied by rectification.

The process of the present invention contemplates the attainment of marked improvements in efficiency and capacity over distillation systems using the processes heretofore known; and in particular, the attainment of substantially absolute purity of the products of distillation ultimately drawn off, a result impossible of achievement in previously known processes, owing to inherent obstacles encountered in the practice of the same.

The principles of the invention, and the various steps employed in the application of said principles to the accomplishment of the desired results, are fully set forth in the following description, and in the annexed claims, reference being had to the accompanying drawing, in which the figure is a diagrammatic illustration of one arrangement of apparatus for carrying out said process.

It is to be understood, however, that the practice of my invention is not confined to the employment of the herein described, or any other particular arrangement of apparatus, nor to the herein described methods of utilizing such apparatus, except in so far as specified in the appended claims; the drawings being merely illustrative, and the description being confined, for the sake of clearness and brevity, to a single special case falling within the scope of the aforesaid principles.

The condensation of a mixed gas, as is well known, is characterized by the initial formation of a liquid much richer in the less volatile element of the mixture than the mixture itself, the vapor residue being correspondingly richer in the more volatile element of the mixture. Generally in prior processes of separation, this vapor residue, containing a high percentage of the more volatile element, is liquefied independently, and is used to rectify the products of evaporation from the aforesaid liquid mixture which contains a high percentage of the less volatile element. In general, the utilization of these two liquefied portions of the mixture in a rectifying column or still involves progressive contact between the ascending vapors from the mixed liquid which is rich in the less volatile element, and the descending liquid which is rich in the more volatile element, causing the descending liquid to exchange with the ascending vapors; whereby the liquid becomes richer in the less volatile element and the vapor becomes richer in the more volatile element, and progressively loses the less volatile component.

It is essential to processes operating on the above principle that the entire supply of the mixed gas be condensed; moreover, the external cooling agency, which in one form or another, is an essential element of all liquefaction systems, is called upon to extract large quantities of heat from a portion of the mixture, (namely that portion showing a high percentage of the more volatile element) at a temperature almost as low as the condensing point of the more volatile element, in order to liquefy the same. Energy, in the form of heat, must be supplied to the liquefied portion containing a high percentage of the less volatile element in order to evaporate the same, and this is usually accomplished by causing the said portion, rich in the less volatile element, to condense a portion of the partly cooled, incoming original mixture, which must therefore, be under considerable pressure. In other words, in the ordinary systems, it is necessary to increase the pressure on the unseparated mixture until its boiling temperature is substantially as low as the boiling temperature of the less volatile element, under the pressure conditions prevailing in the still.

It is characteristic of such prior processes that the pressures on the descending liquid and ascending vapors in the still are equal; it is essential, moreover, that the temperature at the top of the rectifying column where the more volatile element is delivered, be maintained almost exactly at the extremely low boiling point of the more volatile element under the low pressure at which rectification is carried out; if much higher, vaporization of the less volatile element will ensue at this point.

Almost exclusively, in such prior processes, the liquefaction of the mixture takes place under high pressure, and the rectification takes place after the pressure prevailing upon both portions of the liquefied mixture has been released. This release of pressure results in the reëvaporation of considerable amounts of both portions of the liquid and, therefore, imposes a serious limitation on the amount of gas capable of being handled by any given apparatus. This reevaporation also diminishes the purity of the product, since at the top of the rectifying column the outgoing more volatile element cannot be drawn off without also taking with it some of the mixed evaporate produced by the release of pressure upon the liquid used for rectification.

According to the present invention, the inherent defects and difficulties above enumerated are overcome, by the utilization of the principle that a mixture of elements in vapor form may be made to condense progressively, and while condensing, may be made to evaporate a liquid mixture of the same elements in different proportions, in such a way that the latent heat of evaporation for the second mixture is supplied by the latent heat of condensation of the first mixture; also by taking advantage of the partial separation accompanying the condensation of a mixture to completely purify the escaping products of distillation, as hereinafter particularly set forth. My invention differs essentially from prior processes in that the liquefaction is acomplished under low or only moderately high pressures, while the distillation takes place under high pressures.

With reference to the application of these principles to the attainment of the objects hereinbefore mentioned, the diagrammatic illustration of one arrangement of apparatus for carrying out the process, as shown in the figure, together with the several steps constituting said process, will now be described in detail.

Referring, by way of example, to the accompanying drawing, the mixed gas dealt with in the process, under relatively low compression, enters a passage 1 of a heat interchanger, designated as a whole by the numeral 2. By the action of said interchanger, in conjunction with a refrigerating engine 3 through which a portion of the gas in passage 1 may be drawn, a quantity of the mixed gas, in a liquid state, collects at 4 in the lower end of passage 1, in the manner common to processes of this class. Obviously, the gas used in the refrigerating engine 3, or other external cooling agency, may, if desired, be drawn from the passage 9, hereinafter referred to, of the heat interchanger, or the refrigerating engine may be contained in a wholly independent circuit. It will be clear that the liquid condensed at 4 will have a composition much higher in the less volatile element than the original mixture, and consequently a higher boiling point, pressure conditions being equal. It follows that the gas remaining uncondensed in passage 1 will have a higher percentage of the more volatile element than the original mixture and a boiling point above the boiling point of said more volatile element but below the boiling point of the original mixture.

Another portion of this uncondensed mixed gas, rich in the more volatile element, is withdrawn into a coil 5, placed inside the cold end of a passage 6 of the interchanger 2; in said coil 5 the gas undergoes intense cooling by the action of the cold gases exhausted by the refrigerating engine 3, which are returned through said passage 6. From the coil 5 the cold gases are led by suitable means, here shown as pipe 7, to a coil 8 placed within the upper end of a third passage 9 of the interchanger. By any suitable means, here shown as pipe 10, said gases are thence led into admixture at 11 with the liquid formed at 4, which liquid undergoes sub-cooling by the exhaust gases from engine 3. The resulting mixture at 11 reaches a composition much higher in the more volatile element than the mixture originally condensed at 4, since the liquid has been cooled to a temperature corresponding to the boiling point of a liquid rich in the more volatile element, and hence will condense the more volatile element from the bubbles of vapor supplied at 11, as they rise through the liquid, said bubbles reaching the surface in the form of a vapor rich in the less volatile element and hence more easily condensed. The resulting mixture is conveyed to a pump 12, which serves to raise it to a much higher pressure than that under which liquefaction took place, and delivers it into the passage 9 of the interchanger, wherein such higher pressure is maintained in any suitable manner, as by imposing a resistance against the outflow of vapor from said passage.

For purposes of illustration, it will be assumed that the gas thus acted upon is air, having, as is well known, a composition of approximately eighty parts nitrogen, the more volatile element, and twenty parts oxygen, the less volatile element. It follows, therefore, that the liquid condensed at 4 in the passage 1 of the heat interchanger will have a much higher percentage of oxygen than atmospheric air; for example, this liquid may contain fifty per cent. of oxygen, and may have its boiling point at 115 degrees centigrade absolute under a pressure of 10 atmospheres, in comparison to a boiling point of 107 degrees centigrade absolute for air, at the same pressure. As a consequence, the vapor remaining uncondensed in the passage 1, which is led through the coils 5 and 8 as heretofore described, may have 85 or 90 per cent. of nitrogen in its composition, with a boiling point above 105 degrees centigrade absolute (the boiling point of pure nitrogen) and below 107 degrees centigrade absolute, at 10 atmospheres pressure.

By the action of the gases exhausted from the refrigerating engine 3, the liquid rich in oxygen formed at 4 is cooled to a temperature corresponding approximately to the boiling point of a liquid rich in nitrogen; and it will be assumed that this liquid, together with the vapor rich in nitrogen mixed therewith at point 11, has its pressure raised from 10 atmospheres to 20 atmospheres by the pump 12, before entering the passage 9. In said passage 9, this liquid is warmed by heat interchange with the liquid in passage 1; at the level 4 where liquid is being condensed in passage 1, the liquid in passage 9 may reach a temperature of 115 degrees centigrade absolute. Above this level, the liquid in 9 extracts heat from the mixed uncondensed vapor in passage 1, the temperature rising gradually as higher levels in the passage 9 are reached. Somewhere above the level 4, as, for instance, at the level 13, a temperature of 117 degrees centigrade absolute is reached, the boiling point of pure nitrogen under 20 atmospheres pressure. Because of the difference in composition of the fluids in passages 1 and 9, the liquid in 9 being richer in nitrogen than the vapor which is just about to condense in 1, there will take place in 9, above the level 13, a partial evaporation with a corresponding partial condensation in 1 at the same level. This action is due wholly to the difference in composition above set forth; it will be seen, therefore, that the increase of pressure imparted to the fluid by the pump is limited by this consideration, and also that the external cooling agency is relied upon to effect a considerable portion of the work required for condensation of the fluid in 1. The action above described takes place over a more or less limited range of temperature levels above the level 13, it being understood that within this range of levels there is no actual lowering of the temperature in passage 1, since only the latent heat of condensation is withdrawn, and applied to the evaporation of the liquid in passage 9. Finally a level is reached where the evaporation in passage 9 can no longer accomplish condensation in passage 1; above this level the evaporation in passage 9 serves to cool the incoming uncondensed gas in passage 1. Owing to the phenomena characterizing the condensation of mixed gases, the level at which condensation first occurs in the passage 1 is considerably higher than that at which the original mixture would completely condense; in the present instance, condensation may begin at or near a level 14 where the temperature is about 122 degrees centigrade absolute, the boiling point of pure oxygen under 10 atmospheres pressure.

The liquid in passage 9, at a level 15 for example, may reach a temperature of 135 degrees centigrade absolute, the boiling point of pure oxygen under 20 atmospheres pressure. The vapors from this liquid ascend in the passage 9 and come in contact with the exterior of coil 8. The cold fluid entering coil 8, under a pressure of 10 atmospheres, has a temperature below 117 degrees centigrade absolute, the boiling point of pure nitrogen at 20 atmospheres; as a consequence, upon the top, or coldest point of said coil, an exterior condensation of pure nitrogen takes place. The liquid thus formed on the exterior of coil 8 gravitates toward the level 15, coming into intimate contact with the vapor rising from said level. The temperature of said liquid rises as the level 15 is approached; in consequence of this, said liquid progressively parts with its nitrogen and extracts oxygen from the rising vapor. The exchange of elements takes place progressively practically throughout the whole traverse of said liquid, so that it reaches the level 15 as practically pure oxygen; and as the temperature at the top of coil 8 is maintained at a point below the boiling point of pure nitrogen under 20 atmospheres pressure, any vapor escaping past this point must be pure nitrogen, if the amount of vapor withdrawn is not in excess of the capacity of the apparatus employed to purify. At the same time, substantially pure oxygen is secured at the level 15, and may be withdrawn through pipe 16, if desired, or may be evaporated and utilized in counter-current apparatus, as coil 17, to aid in cooling the incoming mixture.

It will be clear that the vapor employed for circulation through the coil 8, in order to produce the rectification above described, need only be cooled by the refrigerating engine to a temperature of approximately 117 degrees centigrade absolute, the boiling point of pure nitrogen under 20 atmospheres pressure. When the ordinary processes are employed, to effect the separation of air, it is usually necessary to cool the liquid used for rectification to the boiling point of nitrogen under atmospheric pressure, namely 80 degrees centigrade absolute, and this cooling must be accomplished at the expense of the external cooling agency, thereby greatly reducing the capacity of the apparatus. As before stated, this vapor from the coil 8 meets the liquid formed in the passage 1 at 11, and owing to its contact with a sub-cooled liquid having a high oxygen content, the vapor is condensed at a higher temperature than if the mixture were of the composition of the residual vapor in passage 1.

It will thus be seen that in dealing with air, the process is dependent upon the reduction of the temperature of the fluid in coil 8, which may contain a considerable percentage of oxygen, below the boiling or condensing point of pure nitrogen, under the greatly increased pressure prevailing in passage 9. It is clear that the amount and composition of the fluid in coil 8 may be varied, and the relation of the pressures prevailing in passages 1 and 9 so adjusted, that the fluid passing through coil 8 may be part liquid, obtained by a partial liquefaction in coil 5 by the evaporation of liquid formed in the cold end of passage 6 by the exhaust from the refrigerating engine 3. In this manner the highest efficiency for the process is obtainable, since in this part of the apparatus the interchange of heat is caused to take place without change in temperature of the fluid which gives up heat or the fluid which absorbs heat; in other words, the heat exchange results only in condensation and evaporation. In order to obtain this result, it is sufficient that the vapor in coil 5 contain a slightly higher proportion of oxygen than the vapor passing into the refrigerating engine 3, thereby making it possible to condense a considerable amount of the vapor in coil 5 by the evaporation of liquid formed at low pressure in the cold end of passage 6.

It will be clear, that the process described above, by way of example, for the separation of air into its component elements, is applicable in all of its aspects to the separation of other mixed gases, many of which possess properties which tend to a more favorable application of the steps of the process than air.

It is to be understood that the process, as herein described, does not of necessity entail either the complete or the absolute liquefaction of the mixed gaseous fluid which is being separated, and that the terms "liquefaction," "liquid" and "liquefied," as used herein and in the appended claims, apply as well to a condition of the fluid where in density and temperature it substantially approaches the liquid state. In such a condition said fluid is susceptible, as will be well understood, to a pressure increase by the expenditure of an almost negligible amount of power.

In the application of the new principles underlying the present process, which differ radically and essentially from the principles underlying previous processes of this class, it is to be understood that my invention is in no sense limited to equivalents of the apparatus here shown, said showing being wholly diagrammatic and illustrative, and adopted solely for the purpose of simplifying the explanation of said broadly new principles.

I claim,

1. The herein described process of separating mixed gases, by liquefaction and distillation, comprising the increase of pressure on the liquefied portion, the progressive liquefaction of the incoming mixture by the evaporation of said liquefied portion under its increased pressure, the rectification of the evaporate from said liquefied portion under its increased pressure by the vapor residue of progressive liquefaction, and the condensation of said vapor residue in said liquefied portion, before the increase of pressure thereon.

2. The herein described process of separating mixed gases, by liquefaction and distillation, comprising the increase of pressure on the liquefied portion, the progressive liquefaction of the incoming mixture by the evaporation of said liquefied portion under its increased pressure, the chilling of the residue of progressive liquefaction, the utilization of said chilled residue to rectify the evaporate of said liquefied portion, under said increased pressure, and the condensation of said residue in said liquefied portion before the increase of pressure thereon.

3. The herein described process of separating mixed gases, comprising the progressive liquefaction thereof, the increase of pressure upon the liquefied portion, including the vapor residue from progressive liquefaction, and the rectification of the evaporate from the liquefied portion, under its increased pressure, by said vapor residue, previous to the latter's condensation.

4. The herein described process of separating mixed gases, comprising the progressive liquefaction of the mixture, the increase of pressure on the liquid formed in the process, the chilling of the residue from progressive liquefaction, the rectification of the vapor of the liquefied portion under its increased pressure by said chilled residue, and the condensation of said residue in the products of progressive liquefaction.

5. The herein described process of separating mixed gases, comprising the liquefaction of a portion of the mixture under low pressure, by the evaporation of another portion under higher pressure, and containing a higher percentage of the more volatile element of the mixture.

6. The herein described process of separating mixed gases, comprising the partial liquefaction of the mixture, the addition to the liquefied portion of the more volatile element of the mixture, the increase of pressure on said portion, and the evaporation thereof, under such increased pressure by the condensation of another portion under lower pressure.

7. The herein described process of separating mixed gases, comprising the rectification of a mixed vapor under high pressure by means of a mixed vapor under low pressure containing a greater proportion of the less volatile element of the mixture than the vapor being rectified.

8. The herein described process of separating mixed gases, comprising the partial condensation, under pressure, of a mixed vapor being rectified by means of a vapor at a lower temperature and pressure.

9. The herein described process of separating mixed gases, comprising the rectification, under pressure, of a mixed vapor, by means of a mixed vapor and liquid composed of the same elements in different proportion and under a lower pressure.

10. The herein described process of separating mixed gases, comprising the condensation of a portion of the mixture by the evaporation of a liquefied portion thereof under higher pressure, said liquefied portion containing a sufficient quantity of the more volatile element of the mixture to lower its boiling point substantially to the temperature of the vapor being condensed.

11. The herein described process of separating mixed gases, comprising the rectification of a mixed fluid under pressure, by means of a mixed fluid containing the same elements in different proportions, under lower pressure.

12. The herein described process of separating mixed gases, comprising the partial liquefaction of the mixture, the sub-cooling of said liquefied portion, and the addition thereto of the vapor residue.

13. The herein described process of separating mixed gases, comprising the partial liquefaction of the mixture, the sub-cooling of said liquefied portion, and the utilization of the latter to condense the more volatile element of the mixture from the vapor residue.

14. The herein described process of separating mixed gases, comprising the partial separation of the components of the mixture by condensation, the chilling of the uncondensed portion, and the rectification of the condensed portion under a higher pressure than that of condensation by said chilled uncondensed portion.

15. The improvement in the art of separating mixed gaseous fluids, which consists in liquefying the fluid under pressure, evaporating the liquefied fluid, and sustaining said pressure on the evaporate from said liquid during the entire process of separating same into its constituent elements.

16. In a process of the character described, the liquefaction, under pressure, of a mixed gaseous fluid, and the complete rectification and separation of said fluid into its constituent elements without releasing the pressure under which said liquefaction was accomplished.

FRED E. NORTON.

Witnesses:
 NELLIE WHALEN,
 GEO. H. KENNEDY, Jr.